Patented July 5, 1938

2,122,786

UNITED STATES PATENT OFFICE 2,122,786

DEHYDROGENATION OF PARAFFIN HYDROCARBONS

Hans Tropsch, Chicago, Ill., assignor to Universal Oil Products Company, Chicago, Ill., a corporation of Delaware No Drawing. Application June 30, 1934,
Serial No. 733,333

3 Claims. (Cl. 260—170)

This invention relates more particularly to the dehydrogenation of paraffin hydrocarbons which are normally gaseous including ethane, propane and the butanes.

In a more specific sense the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casing-head gases and this supply is further augmented by the gases produced in cracking oils for the production of gasoline although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives on account of its unreactive character in comparison with their olefinic counterparts.

In one specific embodiment the present invention comprises the dehydrogenation of gaseous paraffin hydrocarbons at elevated temperatures in the presence of catalysts comprising magnesium oxide activated by chromium and/or zinc compounds.

In a preferred embodiment the catalyst consists of magnesium oxide activated or promoted by the presence of small amounts of zinc oxide and/or chromium oxides.

The field of catalysis is in general empirical as but few rules have been evolved out of a large mass of experimental data. For each specific type of chemical reaction certain catalysts or groups of catalysts have been found to be of value. As an example, in sulphuric acid manufacture wherein sulphur dioxide is oxidized to sulphur trioxide, the noble metals platinum and palladium have been found to be effective catalysts and also vanadium oxides, although these substances are widely different chemically. In the field of hydrogenation the oxides and sulphides of metals of the 6th group of the periodic table including chromium, molybdenum and tungsten have been found to be of value, particularly on account of their resistance to sulphur poisoning. These two instances are merely cited to show that in the field of catalysis there is little chance of predicting what materials will be most effective in promoting a given type of reaction.

In the present instance the catalyst mixtures which are preferred for selectively dehydrogenating the lower boiling paraffinic hydrocarbons have been evolved as the result of a large number of experiments with catalysts having a dehydrogenating action upon various types of hydrocarbons such as are encountered in the fractions produced in the distillation of petroleum and other naturally occurring hydrocarbon oil mixtures. The criterion of an acceptible dehydrogenating catalyst is that it shall split off hydrogen without inducing either carbon separation or scission of the bonds between carbon atoms. For this purpose mixtures comprising major amounts of magnesium oxide and minor amounts of zinc and chromium compounds, particuarly their oxides, have been found to be particularly valuable and efficient. While magnesium oxide alone is an effective dehydrogenating catalyst in the above sense, the tendency to carbon deposition is lessened by the use of the present type of activators so that the dehydrogenating action is rendered more definite and effective.

In making up catalyst composites of the preferred character and composition, the following is the simplest and generally the preferred procedure. Natural magnesite is calcined at temperatures of from 800 to 900° C. to produce a mixture containing a high percentage of magnesium oxide, the oxide is then ground to produce granules of relatively small mesh and these are given the requisite amounts of chromium and zinc compounds by mixing them with aqueous solutions or suspensions of selected salts or salt mixtures. The magnesium oxide resulting from calcination has a high absorptive capacity for the activating materials and readily takes up the required percentages from aqueous solutions. To insure complete absorption of salts from the solutions and at the same time a uniform distribution upon the magnesium oxide granules, the latter may be added to relatively dilute solutions of salts and these may then be concentrated until a critical point is reached corresponding to complete removal of dissolved material. At this point the solvent may be removed by filtering or pressing or evaporation by heat.

Other alternative methods of preparing the preferred composite catalysts may be employed. For example, the calcined magnesium oxide may be stirred into solutions of salts of chromium and zinc and the hydrates precipitated by the addition of alkali metal hydrates or carbonates such as, for example, sodium carbonate, this serving to fix the precipitates upon the granules of magnesium oxide. Usually the mixed solid particles are then ignited to produce a mixture of oxides. When using solutions of zinc and chromium nitrates the mixture of magnesium oxide granules and the solution may be evaporated to dryness and further heated to decompose the nitrates and produce residual oxides.

In regard to the proportions of the three components of the preferred catalysts, magnesium oxide is ordinarily used in largest quantity and in some cases mixtures may be effectively employed which contain 90% by weight of magnesium oxide and 5% each of chromium and zinc compounds. Very effective dehydrogenating catalysts for the present type of reactions are those containing approximately 90 to 95% of magnesium oxide and 5 to 10% of a mixture of zinc oxide and chromium oxides.

In practicing the dehydrogenation of paraffinic gases according to the present process a selectively proportioned mixture of the three oxides is used as a filler in a reaction tube or chamber in the form of particles of graded size or small pellets and the gas to be dehydrogenated is passed through the catalyst after being heated to the proper temperature, usually within the range of from 300 to 700° C. The catalyst tube may be heated exteriorly if desired to maintain the proper reaction temperature. The pressure employed may be atmospheric or slightly superatmospheric of the order of from 50 to 100 pounds per square inch, though any large amount of pressure has a tendency to depress the dehydrogenation reactions disproportionately to the increase in capacity of the plant.

The exit gases from the tube or chamber may be passed through selective absorbents to combine with or absorb the olefin or olefin mixture produced or the olefins may be selectively polymerized by suitable catalysts, caused to alkylate other hydrocarbons such as aromatics or treated directly with chemical reagents to produce desirable and commercially valuable derivatives. After the olefins have been removed the residual gases may be recycled for further dehydrogenating treatment with or without removal of hydrogen.

The present type of catalyst is unusually selective in removing two hydrogen atoms from a paraffin molecule to produce the corresponding olefin without furthering to any great degree undesirable side reactions, and because of this shows an unusually long period of activity in service as will be shown in a later example. When, however, the activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the oxides and decrease their efficiency. It is characteristic of the present type of catalyst that it may be repeatedly regenerated without loss of porosity or catalyzing efficiency.

Numerous experimental data could be adduced to indicate the results obtainable by employing the present type of catalyst to dehydrogenate paraffins but the following single example is sufficient to show the general effectiveness of the preferred oxide mixture.

A catalyst was employed which consisted of 94% magnesium oxide, 3% chromium trioxide and 3% zinc oxide, the mix having been made by impregnating the granular magnesium oxide with the nitrates of chromium and zinc in the required proportions and then igniting at a temperature of approximately 500° C.

Using small pellets of the above oxide mixture made by moistening and compressing and later drying, isobutane was passed through a treating tower containing the pellets as filler at atmospheric pressure and temperature of about 600° C., with a space velocity of from 40 to 50 per hour.

The following table shows the nature of the results obtained by means of gas analyses taken at indicated times from the start of the run.

*Composition of dehydrogenated gases*

| Time after start, hours | 40 | 80 | 150 | 250 |
|---|---|---|---|---|
| i-Butylene, percent | 24.5 | 23.4 | 24.5 | 24.5 |
| Other butylenes and propylene, percent | 6.4 | 5.3 | 5.5 | 6.0 |
| Ethylene, percent | 2.1 | 2.2 | 4.5 | 2.0 |
| Paraffins (mainly i-butane), percent | 35.1 | 37.2 | 35.5 | 38.5 |
| Hydrogen, percent | 31.9 | 31.9 | 30.0 | 29.0 |

From the above data it will be seen that the dehydrogenation corresponds closely to the calculated equilibrium mixture at 600° C., which should contain approximately 33% hydrogen, 33% butane and 33% butylenes. Substantially 50% of the original isobutane was converted into olefins and hydrogen.

It is to be further observed that the catalytic activity is maintained substantially constant for the period of the run of approximately 10 days.

The foregoing specification and example are sufficient to show that the invention has intrinsic value when practiced in the art, but neither is to be construed as imposing limitations upon the scope of the invention, as both are given for illustrative purposes only.

I claim as my invention:

1. A process for the dehydrogenation of gaseous paraffin hydrocarbons to produce olefin hydrocarbons which comprises, subjecting the said gaseous paraffin hydrocarbons to an elevated temperature in the presence of magnesium oxide, chromium trioxide and zinc oxide.

2. A process for the treatment of gaseous paraffinic hydrocarbons to produce olefin hydrocarbons therefrom which comprises, heating the said gaseous paraffinic hydrocarbons in the presence of a catalyst comprising approximately 90% by weight of magnesium oxide and 5% each by weight of chromium trioxide and zinc oxide.

3. A process for the dehydrogenation of gaseous paraffinic hydrocarbons to produce olefinic hydrocarbons therefrom which comprises, subjecting the said gaseous paraffinic hydrocarbons while in heated condition to the action of a catalyst comprising not less than 90% magnesium oxide and containing in addition chromium trioxide and zinc oxide.

HANS TROPSCH.